United States Patent
Woywod et al.

(10) Patent No.: US 6,438,464 B1
(45) Date of Patent: Aug. 20, 2002

(54) METHOD AND DEVICE FOR DETECTING THE OVERTURNING HAZARD OF A MOTOR VEHICLE

(75) Inventors: Jürgen Woywod, Mörfelden; Ralph Gronau, Wetter; Dieter Burkhard, Waldfischbach-Burgalben; Hans Georg Ihrig, Darmstadt; Lothar Kienle, Lampertheim, all of (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/743,942
(22) PCT Filed: Jul. 16, 1999
(86) PCT No.: PCT/EP99/05080
§ 371 (c)(1), (2), (4) Date: Apr. 13, 2001
(87) PCT Pub. No.: WO00/03887
PCT Pub. Date: Jan. 27, 2000

(30) Foreign Application Priority Data

Jul. 16, 1998 (DE) .......................................... 198 31 841
Dec. 7, 1998 (DE) .......................................... 198 56 303

(51) Int. Cl.⁷ .................................................. G06F 7/00
(52) U.S. Cl. ................................ 701/1; 701/38; 701/72
(58) Field of Search .............................. 701/1, 36, 38, 701/45, 48, 65, 72

(56) References Cited

FOREIGN PATENT DOCUMENTS

| DE | 196 02 994 | 7/1997 |
|----|-----------|--------|
| DE | 196 07 050 | 8/1997 |
| DE | 196 32 943 | 2/1998 |
| EP | 0 758 601  | 2/1997 |

Primary Examiner—William A. Cuchlinski, Jr.
Assistant Examiner—Edward Pipala
(74) Attorney, Agent, or Firm—Rader, Fishman & Grauer PLLC

(57) ABSTRACT

The present invention relates to a method of detecting the roll angle of a cornering vehicle which comprises at least one axle and at least two wheels, the vehicle being equipped with a transverse acceleration sensor means which senses the transverse acceleration that acts on the center of gravity of the automotive vehicle generally in the horizontal plane of the vehicle. To provide a method which does not require an additional sensor means and is virtually independent of given vehicle characteristics or dimensions, the component of the transverse acceleration which essentially acts in the horizontal plane of the vehicle is detected by the transverse acceleration sensor means during cornering. In addition, a condition variable which is correlated to the centrifugal acceleration acting on the center of gravity is detected, and the roll angle of the vehicle is calculated from the difference between the detected component of the transverse acceleration and the determined centrifugal acceleration, the said difference being weighted with a factor.

16 Claims, 4 Drawing Sheets

METHOD AND DEVICE FOR DETECTING THE OVERTURNING HAZARD OF A MOTOR VEHICLE

TECHNICAL FIELD

The present invention generally relates to vehicle stability control, and more particularly relates to a method and a device for detecting the risk of rollover in vehicles which are equipped with a driving stability control system.

BACKGROUND OF THE INVENTION

It has been known for long that in vehicles having a high center of gravity and/or a small tread width, for example trucks, track trailer units, buses, small buses, and off-road vehicles, there is a rollover risk during cornering with a major roll motion. Various models for rollover accidents are described on pages 309 to 333, chapter 9, of the book "Fundamentals of Vehicle Dynamics", by T. D. Gillespie, Society of Automotive Engineers, Inc., Warrendale 1992, which is referred to in full extent in the present context. Starting with a quasi-stationary model for a rigid vehicle by way of a quasi-stationary model for a sprung vehicle up to dynamic models in consideration of inherent roll frequencies, conditions for existing rollover hazards are indicated.

However, it has been found more recently that lateral motions of passenger vehicles may also build up until the vehicle rolls over. Such a risk of rollover is considerably increased by improper loading, e.g. extremely on one side or on the vehicle roof, because the center of gravity of the mass of the vehicle is shifted upwards or to one side. In addition, it is that more frequently vehicles are registered in recent times which are designed as passenger cars with a relatively high center of gravity, for example, the new vehicle class of the so-called "vans".

To explain the physical driving conditions underlying rollover, FIG. 2a shows a schematic rear view of a vehicle 210 standing on a roadway 200. Reference numerals 103 and 104 designate the wheels of the rear axle. It is assumed that the vehicle is in a left turn, thus would move to the left in a projection to the drawing plane. The circular travel of the vehicle produces a centrifugal force $Z = mw \times \omega 2 \times r = m \times v2:r$, wherein m is the vehicle mass, $\omega$ the angular velocity during circular travel, v the vehicle speed and r the radius of the circular travel. The acting centrifugal force Z which can be represented as a product $aq \times m$, with aq being the transverse acceleration, can be assumed to act on the center of gravity S of the vehicle. The center of gravity S is disposed roughly centrically between the wheels and at a height h above the roadway. Acting on the center of gravity S is also the weight force $G = m \times g$, wherein g is the gravitational acceleration. As long as the vehicle drives on the desired circle ($aq = v2:r$ applies then), i.e., as long as the cornering forces F on the four wheels (roughly corresponding to $F = \mu \times G$, wherein $\mu$ is the coefficient of friction between tires and roadway) equals the centrifugal force Z, the above-mentioned centrifugal forces will develop according to the above equation. It may happen then that the vehicle will roll over the outside wheel due to an unfavorable torque distribution. This will principally happen when $G \times b:2 < Z \times h$ applies, wherein h is the height of the center of gravity S above the roadway 200 and b:2 is roughly half the tread width of the vehicle. The above inequation is a first approximation of the torque equilibrium about the point P. When the outwards turning torque $Z \times h$ is greater than the inwards turning torque $G \times b:2$, the vehicle will roll over outwards. This risk is encountered especially with vehicles having a small tread width (b:2) and a comparatively great height and, thus, a high center of gravity (high value of a), e.g. caused by a roof load 220 on the vehicle 210.

To effectively avoid a like operating condition, it is necessary to
- detect a critical situation, especially a driving condition with a critical transverse acceleration, and
- take appropriate countermeasures following the detection.

In conventional driving dynamics control systems, for example, the ESP system (Electronic Stability Program) by the applicant, driving dynamics parameters, among others the transverse acceleration, the time variation of the transverse acceleration, or the tire slip angle, are provided as driving dynamics parameters which are indicative of the tendency of vehicle rollover about the longitudinal axis of the vehicle. A corresponding method for the operation of a vehicle with brake interventions that stabilize driving is e.g. described in German published patent application DE-A 196 32 943 "Method for the operation of an automotive vehicle with brake interventions that stabilize driving"Daimler-Benz Aktiengesellschaft, wherein the transverse acceleration is taken into consideration as the only driving-dynamics parameter indicative of the vehicle's tendency to rollover about the longitudinal vehicle axis. An associated predefinable rollover prevention threshold value is provided for the transverse acceleration.

During cornering, the vehicle is kept to track by the transverse forces which act at the tire tread surfaces on the roadway. The largest part of these transverse forces is produced by the curve-outward wheels or tires. When the transverse acceleration which occurs during cornering exceeds the rollover prevention threshold value, the curve-outward wheels will adopt a condition of high brake slip caused by activation of a corresponding brake intervention, with the result that the transverse force that can be transmitted by the tires is considerably reduced. Consequently, the curve-outward wheels can no longer withstand the transverse acceleration acting upon them (which will possibly increase the sideslip angle and turn the vehicle front end or the vehicle rear end slightly in the direction of the transverse acceleration torque). However, simultaneously, the rollover torque is reduced and rollover of the vehicle about its longitudinal axis prevented. In addition to this, the above-mentioned publication discloses an embodiment wherein the time variation of the transverse acceleration is taken into account as an indicative driving-dynamics parameter.

In published patent application DE-A 197 46 889 "Vehicle Motions Control System", by Aisin Seiki K.K. et al, a system for increasing the lateral stability of an automotive vehicle during cornering is described wherein there is provision of a rollover detection unit for detecting a rollover motion of a normal axle of the vehicle with respect to the vehicle's vertical axis and a cornering determining unit for determining a cornering condition of the vehicle. To calculate the vehicle rollover motion or the vehicle rollover, either the difference in height between the right and the left vehicle side or the transverse acceleration of the vehicle is detected to establish the roll angle between the horizontal vehicle line and the horizontal roadway line. A linearity between the transverse acceleration aq and the vehicle rollover designated by a roll angle gamma is made the basis. When the inclination detection device detects a rollover risk, a countersteering yaw torque is produced by slowing down the curve-outward front wheel.

As has been described hereinabove though, the allowed transverse acceleration and the allowed roll angle depend on the center of gravity of the vehicle, especially the height of the vehicle center of gravity.

The known methods and systems for detecting the vehicle inclination or the roll angle, on the one hand, include the shortcoming that they require additional sensor means, for example, in the event of an inclination detection device with quantities that determine the difference in level between the right and the left vehicle sides, or that they depend on current vehicle characteristics such as the load condition or the center of gravity of the entire vehicle and, consequently, are subject to the requirement of constantly updating the basic vehicle data.

In view of the above, an object of the present invention is to provide a method and a device which overcome the above-mentioned disadvantages, i.e., which obviate the need for any additional sensor means and, in addition, are virtually independent of given vehicle characteristics or quantities.

To achieve this object, it is provided in the method of the present invention and the related device that the component of the transverse acceleration which generally acts in the horizontal plane of the vehicle is detected during cornering by means of the transverse acceleration sensor means, that a condition variable which is correlated to the centrifugal acceleration that acts on the center of gravity is determined, and that the roll angle of the vehicle is calculated from the difference between the detected component of the transverse acceleration and the determined centrifugal acceleration, the said difference being weighted with a factor.

Thus, the present invention is based on the concept of using a—principally disadvantageous characteristic—characteristic of transverse acceleration sensors, i.e., the limitation of the measurement range in the predetermined horizontal plane of the vehicle, in such a manner that precise indications of the current rollover angle of the vehicle can be concluded from the deviation of this measured variable and the actual transverse acceleration which acts on the vehicle's center of gravity (=centrifugal force). This deviation can be seen in particular in a measurable difference of the absolute values of these two transverse acceleration values.

The special advantage of using the rollover (roll) angle in sensing the rollover risk of a vehicle includes that this angle permits more precise statements about the imminent rollover risk than, for example, the transverse vehicle acceleration does. This is because the judgment of the rollover risk based on the roll angle requires no further model analyses other than the knowledge of the center of gravity of the vehicle. In contrast thereto, however, the generic methods known from the state of the art wherein the transverse acceleration as an output quantity is mostly made the basis, require further model analyses to be able to infer the rollover risk from the transverse acceleration data.

More particularly, the present invention avoids the necessity of technically complicated devices for determining the roll (rollover) angle and exclusively makes use of existing measured quantities and vehicle parameters. In addition, rollover sensing by way of the roll angle is independent of the majority of vehicle and roadway characteristics and, therefore, can favorably be achieved in a simple and low-cost manner. Variable vehicle parameters such as the current center of gravity which becomes a variable quantity due to the current load condition (maximum passenger and roof load) are not taken into consideration as values in rollover sensing.

In addition, the quantities obtained in the rollover sensing can be used directly as input data in an ESP system, that means, the present invention may be implemented in an especially favorable manner as another feature or function of the ESP.

Further advantages are involved because accident prevention is possible already before the curve-inward wheels actually lift off when rollover begins. In addition, dynamic driving situations can be taken into account with respect to the roll angle velocity.

In a favorable aspect of the present invention, it may further be provided that upon determining the condition variable correlated to the centrifugal acceleration, the difference of the wheel speeds on at least two axles is determined and a plausibility analysis is performed by comparison of the so obtained condition variables. Due the two independently found data, a check of the data produced can be effected to the end that vehicle conditions where e.g. only one single wheel loses the road contact, the resulting, apparently very great rotational speed differences and, hence, transverse accelerations can be interpreted as measurement errors and will in this case suitably prevent intervention of the ESP, for example.

DETAILED DESCRIPTION OF THE PREFERRED EMBODIMENTS

Figure 2A:
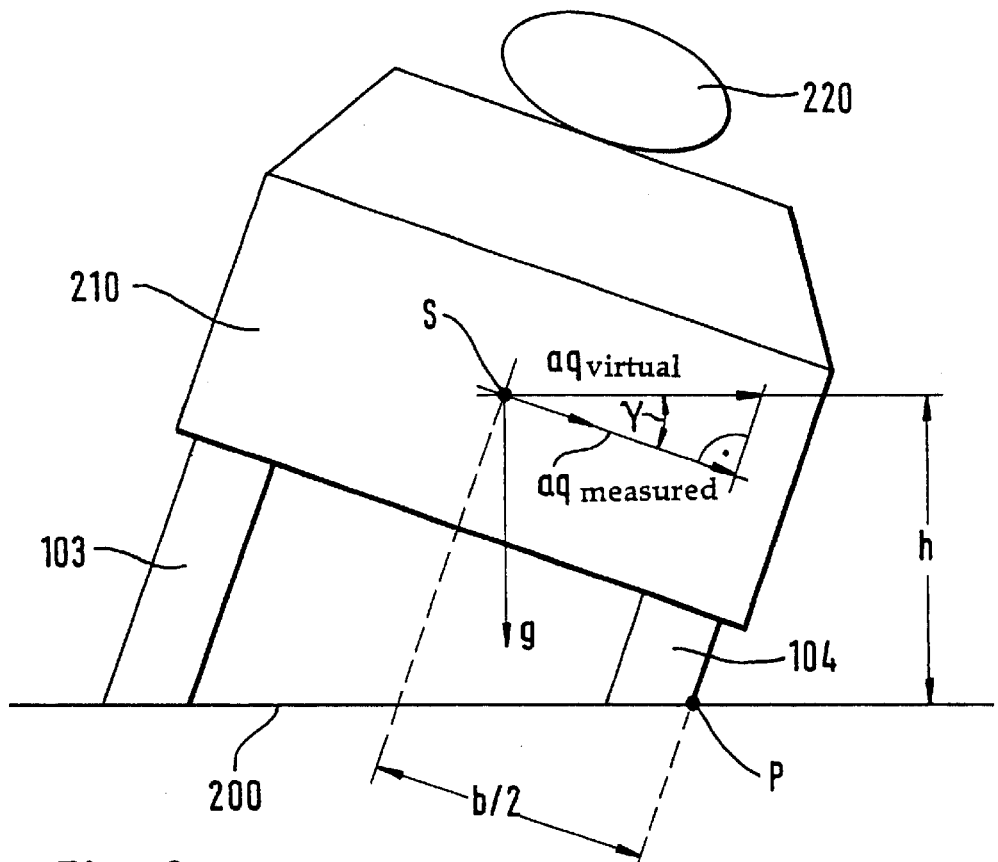
FIG. 2a is a schematic rear view of a vehicle.

Making reference to FIG. 2a, a vehicle will roll over at different critical transverse accelerations depending on the load condition and, hence, the given height of the center of gravity. To be able to detect a rollover tendency irrespective of the load condition, the method of the present invention calculates the current roll condition with the assistance of appropriate transverse acceleration information.

Figure 2B:
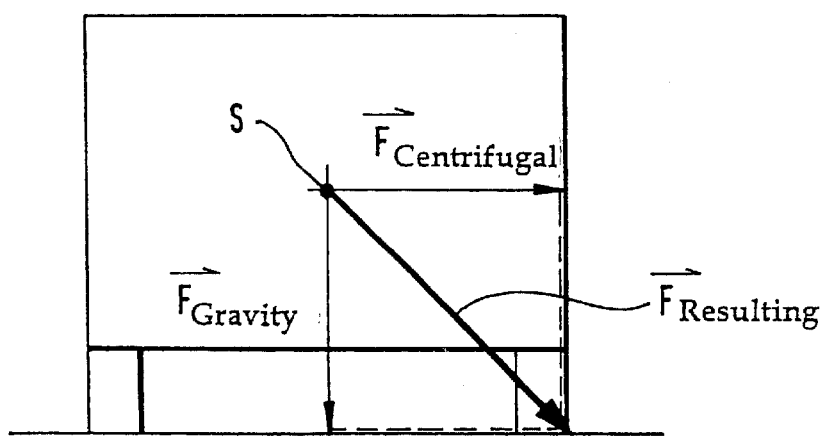
FIG. 2b is a schematic view of the force conditions of a vehicle during cornering.

It can be seen from FIG. 2b that a vehicle rolls over when the force vector that results from gravitational force and centrifugal force, whose application point is coincident with the center of gravity of the vehicle, no longer meets the bottom within the trapeze formed of the respective points of contact of the wheels. As is known, the transverse acceleration due to cornering and the vehicle mass are included as factors in the centrifugal force, while the acceleration due to gravity and the vehicle mass are included as factors in the gravitational force.

The tread width and the center of gravity are vehicle-related geometrical quantities which influence the rollover behavior of a vehicle. In addition, the center of gravity shifts in the curve-outward direction due to rolling motion of the vehicle. The damping and spring characteristics of the chassis, therefore, have an influence on the rollover behavior. Further, the coefficient of friction between tires and road surface limits the maximum possible transverse acceleration.

In case the amount of the transverse acceleration that develops is so high that the force vector comprised of centrifugal force and gravitational force will be shifted to lie outside the square defined by the tire tread surface, vehicle rollover will occur. Consequently, the transverse acceleration represents the driving-dynamics limiting quantity which is the cause for rollover.

Both during stationary cornering and driving maneuvers with variable dynamics, a vehicle can roll over depending on the load condition and, hence, height of the center of gravity, with different critical transverse accelerations. To be able to detect a critical rollover tendency irrespective of the load condition, the method of the present invention calculates the current roll condition from the basic transverse acceleration information. As is shown in FIG. 2a, upon the occurrence of a roll angle of the vehicle with respect to the level roadway, the working plane of an assumed transverse acceleration sensor which can sense transverse acceleration values only within a predetermined working plane is no longer concurrent with the direction of the centrifugal force. With the roll angle gamma of the vehicle, the following correlation to the transverse acceleration $aq_{measured}$ measured in the acceleration sensor, to the transverse acceleration $aq_{virtual}$ with respect to the plane, and to the acceleration due to gravity g is produced:

$$aq_{measured} = aq_{virtual} \times \cos(\text{gamma}) + g \times \sin(\text{gamma}) \qquad (1)$$

With small angles, sin(gamma) may be replaced by gamma and cos(gamma) by 1 in a first approximation. The following formula is produced by reforming (1):

$$\text{gamma} = (aq_{measured} - aq_{virtual})/g \qquad (2)$$

Hence, a comparison between the measured transverse acceleration and a virtual acceleration is made the basis in the method according to the present invention for determining the rollover tendency (=roll angle).

The transverse acceleration $aq_{virtual}$ which actually acts on the vehicle center of gravity can be calculated as a virtual signal according to the following equation either from the wheel speeds $v_r$ of the right wheel and $v_l$ of the left wheel, and the vehicle speed v and the vehicle tread width S:

$$aq_{virtual} = v_r - v_l \times v S \qquad (3)$$

Alternatively, the virtual transverse acceleration can be determined by way of the following correlation when a yaw rate sensor with a yaw rate I is provided:

$$aq_{virtual} = I \times v \qquad (4)$$

wherein cos(gamma) is set to equal 1. The so determined roll angle will furnish a direct standard for the rollover hazard of a vehicle during stationary cornering in comparison to vehicle-related known limiting values.

During unstationary driving conditions, for example, when steering into a curve or during driving maneuvers with variable dynamics, the time derivative of the roll angle, the roll angle velocity, will early indicate an imminent rollover condition in addition. Thus, when the roll angle rises rapidly, the system can intervene already at a lower threshold value of the roll angle.

During travels on an inclined roadway the roadway cross-slope angle adds to the roll angle. To avoid unjustified rollover detection on an inwards inclined vertical bank, additionally, the signs of the roll angle and those of the measured transverse acceleration must be compared and judged accordingly. On the other hand, there is no rollover risk anyway in the presence of a roll angle in the direction of the curve inner side and with an undercritical measured transverse acceleration.

Figure 1:
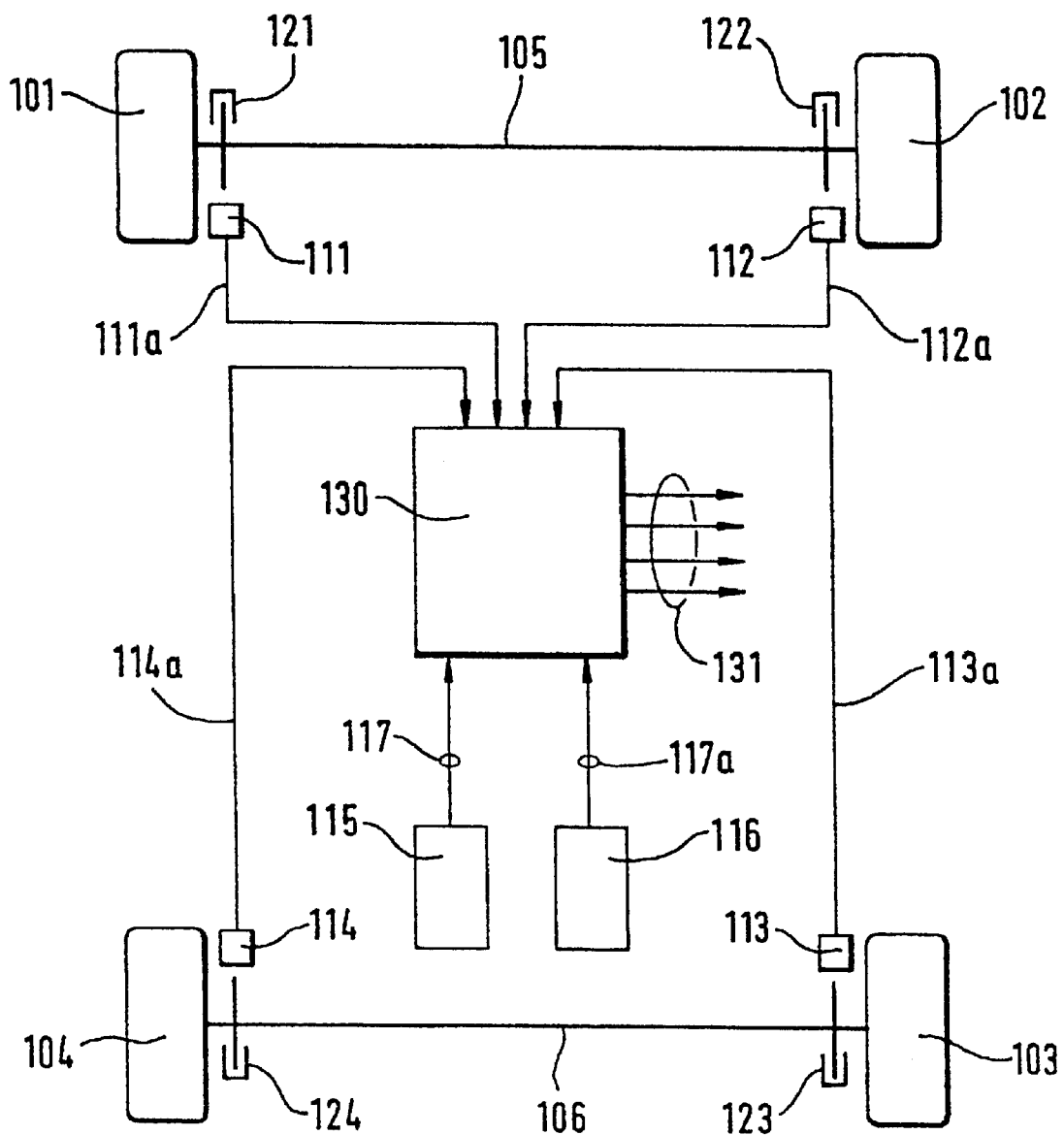
FIG. 1 is a schematic top view of a vehicle.

The device according to the present invention for determining the roll angle of an automotive vehicle will be explained in more detail in the following by way of a preferred embodiment. In the schematic top view of an automotive vehicle chassis, as shown in FIG. 1, reference numerals 101 to 104 designate the wheels of the vehicle in the order front left—front right—rear right—rear left. Corresponding to the state of the art, this vehicle has front-wheel and rear-wheel brakes 121 to 124 and wheel sensors 111 to 114 known in an anti-lock system (ABS) or an electronic stability program (ESP), by means of which sensors the rotational speeds (hereinbelow called "wheel speeds") of individual wheels can be determined. In general, so-called corrected wheel speeds are made the basis wherein wheel-related data such as wheel diameters are taken into consideration. The wheel diameters are no fixed quantities, instead, they vary e.g. with the thickness of the tire tread or with an exchange of summer tires and winter tires. Relay of the data obtained in the wheel sensors is effected by signal lines 111a to 114a.

It is furthermore presupposed in the implementation of the method of the present invention that the transverse acceleration $aq_{measured}$ is determined by using sensor means known from the state of the art, for example, by means of a transverse acceleration sensor 115 or, alternatively, a yaw rate sensor 116. In the case of a transverse acceleration sensor, a transverse acceleration $aq_{measured}$ irrespective of a vehicle model is output. On the other hand, the use of a yaw rate sensor 116 requires the conversion of determined yaw rates (rotational speed abut the vertical axis of the vehicle) by way of a vehicle model from the data obtained into transverse acceleration data. A vehicle model of this type and corresponding conversions are described, for example, in Mitschke, M.: "Dynamik der Kraftfahrzeuge" (Automotive Vehicle Dynamics), volume A—C, Springer Verlag Heidelberg, which is considered to be referred to in full extent in the present context.

The data obtained from the wheel sensors are sent to a control device 130 by means of signal lines 111a to 114a. The data output by the transverse acceleration sensor 115 or, possibly, yaw rate sensor 116 are sent to this control device 130 accordingly. The output data of the control device 130 are sent by way of signal lines 131 to the devices provided for the reactive intervention on the vehicle, e.g., to the vehicle brakes or, in the case of engine intervention, to an engine management unit which is not referred to herein. The details of implementation for achieving the reactive intervention are e.g. described in patent application 19830189.8 and patent application 19830190.1 which are considered to be referred to in full extent in the present context.

Figure 3:
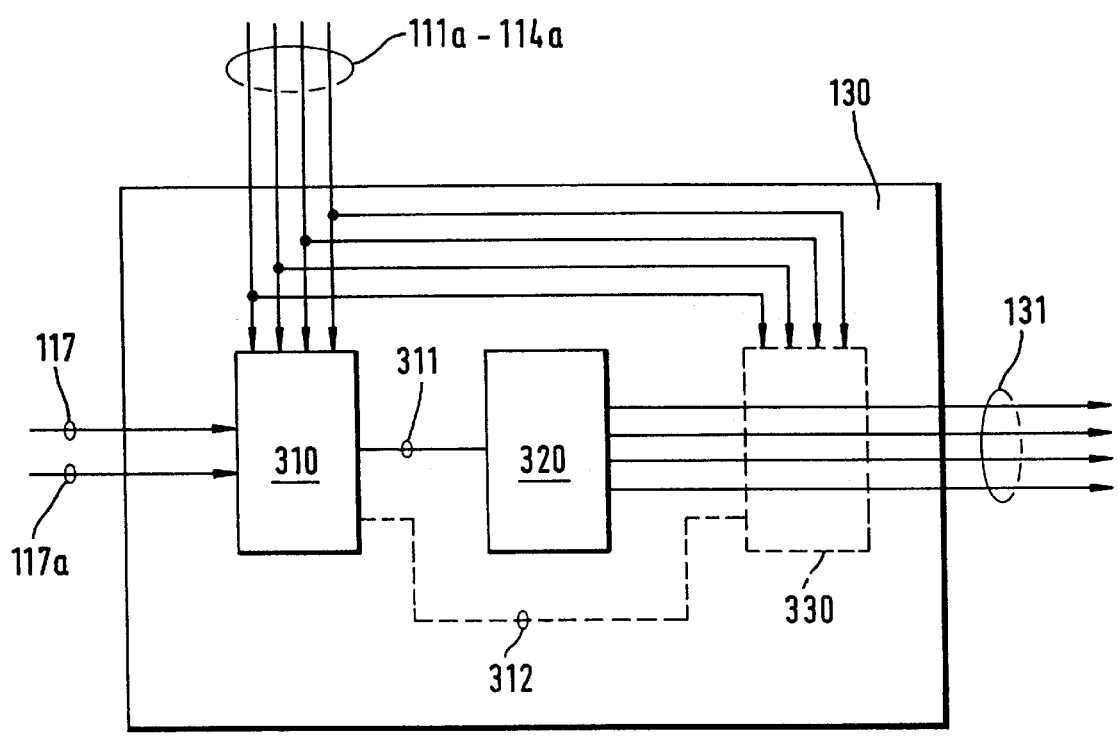
FIG. 3 is a block diagram of an embodiment of the device of the present invention.

A preferred embodiment of the control device 130 is described more closely by way of FIG. 3. On the one hand, the signals transmitted from the wheel sensors according to FIG. 1 to the control device 130 byway of signal lines 111a to 114a are sent to a detection device 310 which is used to detect a driving condition with a critical roll angle. The transverse acceleration which actually acts on the center of gravity of the vehicle is determined from the wheel rotational speeds of the inside and outside wheels according to equation (3), and a plausibility analysis, i.e., analyses as to whether wheels are already exposed to slip or controlled by ABS or TCS, can be performed as a first step in case of need. Alternatively, the data measured by a yaw rate sensor (not shown in detail) which are also sent to the detection device 310 by way of the signal line 117a can be made the basis for determining the actual transverse acceleration. Further, the (falsified) transverse accelerations determined by the transverse acceleration sensor are sent to the detection device 310 by way of the signal line 117. From the mentioned quantities, the current roll angle of the vehicle is calculated by means of the detection device corresponding to equation (2) and compared with a predetermined critical roll angle. When the critical value is exceeded, the detection device 310 will output by way of a signal line 311 a control signal to an influencing device 320 ("actuator") which, in turn, supplies corresponding output signals by way of signal lines 131 for influencing the brake pressure on at least one wheel brake cylinder.

Further, provision may be made that the influencing device 320 of the present invention is connected upstream of other controllers or control units. This is indicated in FIG. 3 by the dotted box 330 which is meant to represent these other control units or controllers. For example, it may be suitable in a drastic braking action to inform these other components 330 qualitatively about the existence of a critical roll angle and to initiate a change in the control strategy during intervention in these other components. It may be desirable insofar to advise the existence of the critical situation to qualitatively further components 330 of brake control by sending a signal 312 so that these components are enabled to modify their strategy appropriately. The influencing device can then be interpreted so that no direct interventions are performed concerning the brake pressures or engine torques, but that nominal values or threshold values of other components for the control of the brake or the engine are influenced, for example.

Figure 4:
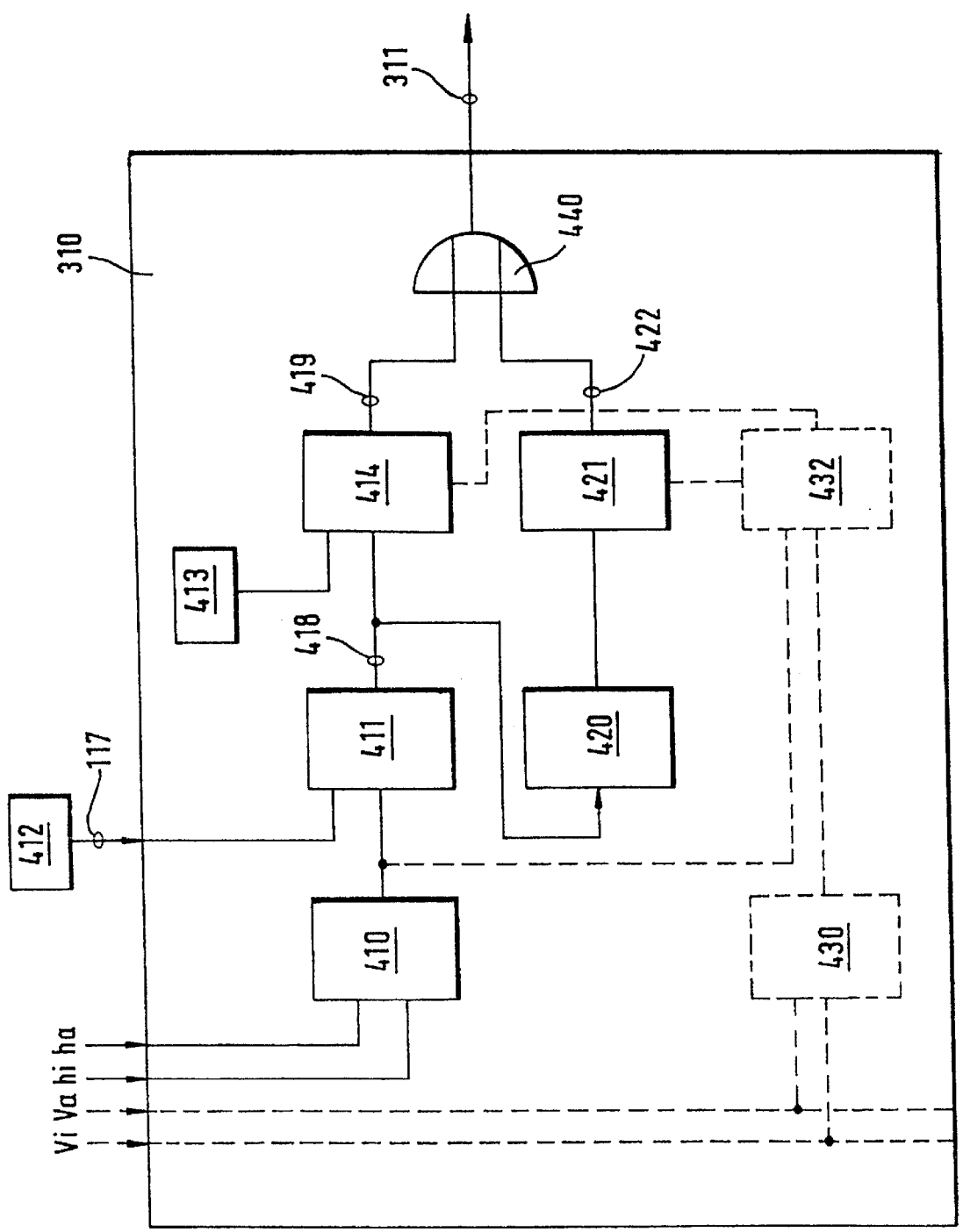
FIG. 4 is a block diagram of an embodiment of the detection device of the present invention shown in FIG. 3.

Now referring to FIG. 4, an embodiment of the detection device 310 will be described which relates to the case of a two-axle and four-wheel vehicle. In the embodiment shown, the detection device 310 includes two acquisition devices 410 and 420 and an optional acquisition device 430. The optional acquisition device 430 is principally applicable only in vehicles which comprise at least two axles for the reasons mentioned hereinabove. An embodiment is shown in which the first acquisition device 410 receives two of four wheel signals, namely those of one axle. These wheel signals correspond to the wheel rotational speeds of the respective wheels. The so-called virtual transverse acceleration aqviral is calculated from the wheel signals according to formula (3). The acquisition device 410 may be a more complex system which determines correction factors for the influence of the wheel radii from the wheel signals.

By means of a calculation device 411, the roll angle is calculated from the virtual transverse acceleration output by the acquisition device 410, and from the transverse acceleration 412 measured by a transverse acceleration sensor according to formula (2). The signal 418 provided at the output of the calculation device 411 corresponds to or is identical with the actual roll angle.

Reference numeral 414 refers to a comparison device which compares the determined value of the roll angle with a reference value stored in a memory 413. If the signal on line 418 exceeds the signal originating from memory 413, a corresponding signal 419 is output. The value stored in 413 shall hence be considered as a threshold value for the roll angle. It results from the geometric considerations referred to in the introductory part of the description. To the extent controllable, the threshold value 413 can be made dependent on parameters, for example, the shifting of maximum load, the height of the center of gravity, etc. The signal 419 indicates the existence of a critical condition and can trigger appropriate intervention measures, for example, brake intervention which stabilizes rollover.

The optional acquisition device 430 supplies a second set of wheel difference data corresponding to the acquisition device 410. A plausibility check 432 can be performed on the basis of the second set of data by comparing them with the data obtained from 410, and the output of an alarm signal can be prevented by the comparison devices, if such a signal appears.

A second (optional) calculation device 420 considers the dynamic behavior of the roll angle. Especially, it can produce the derivative of the signal prevailing at signal conduit 418, for example, and submit the so obtained signal to an evaluation device 421. A positive dynamics indicates that the roll angle increases. The evaluation device 421 can link this information to possibly existing further values such as the already absolute value of the roll angle (on signal conduit 418), the driving speed, etc., in conformity with appropriate criteria and produce another alarm signal 422 therefrom.

Finally, the alarm signals 419 and 422 are combined in one single alarm signal by means of an OR gate, and output as signal 311 by the detection device 310 to the influencing device 320.

What is claimed is:

1. Method of preventing rollover of a cornering vehicle which comprises at least one axle and at least two wheels, the vehicle being equipped with a transverse acceleration sensor which senses the transverse acceleration that occurring at the center of gravity of the vehicle in the horizontal plane of the vehicle, comprising the steps of:

detecting the component of the transverse acceleration which generally acts in the horizontal plane of the vehicle is detected during cornering by the transverse acceleration sensor means, determining a condition variable which is correlated to the centrifugal acceleration that acts on the center of gravity, calculating the roll angle of the vehicle from the difference between the detected component of the transverse acceleration and the determined centrifugal acceleration, weighting the result of the roll angle calculation with a factor comparing the weighted roll angle with a critical roll angle, and introducing a stabilizing act on the vehicle when the critical roll angle is exceeded by way of influencing the wheel torque.

2. Method as claimed in claim 1, wherein the condition variable correlated to the centrifugal acceleration is calculated from the difference of the wheel speeds of at least one curve-inward and at least one curve-outward wheel.

3. Method as claimed in claim 2, wherein said vehicle includes at least two axles and four wheels, and wherein the steps of determining the condition variable correlated to the centrifugal acceleration, further includes determining the difference of the wheel speeds on at least two axles and performing a plausibility analysis by comparing the so obtained condition variables.

4. Method as claimed in claim 1, wherein the condition variable correlated to the centrifugal acceleration is calculated from the yaw rate measured by means of a yaw rate sensor.

5. Method as claimed in claim 1, further including the step of comparing the algebraic signs of the roll angle and of the measured transverse acceleration for correction in the event of an inclined roadway.

6. Method as claimed in claim 1, wherein the critical roll angle is weighted as a function of the actual center of gravity of the vehicle.

7. Method as claimed in claim 1, wherein the critical roll angle is weighted with the current centrifugal acceleration.

8. Method as claimed in claim 1, wherein the time derivative of the roll angle is taken into consideration as a critical condition variable.

9. Device for preventing rollover of a cornering vehicle which includes at least one axle and at least two wheels, the vehicle being equipped with a transverse acceleration sensor means which senses the transverse acceleration that occurs at the center of gravity of the automotive vehicle in the horizontal plane of the vehicle, comprising:

> transverse acceleration sensor for detecting the component of the transverse acceleration which generally acts in the horizontal plane of the vehicle,
>
> means for determining a condition variable which is correlated to the centrifugal acceleration that acts on the center of gravity,
>
> means for calculating the roll angle of the vehicle from the difference between the detected component of the transverse acceleration and the determined centrifugal acceleration, the difference being weighted with a factor,
>
> means for comparing the calculated roll angle with a critical roll angle, and
>
> means for performing an intervention that stabilizes rollover on the vehicle when the critical roll angle is exceeded by way of output signals in order to influence the brake or the torque.

10. Device as claimed in claim 9, further including means for calculating the condition variable correlated to the centrifugal acceleration from the difference of the wheel speeds of at least one curve-inward and at least one curve-outward wheel.

11. Device as claimed in claim 9 further including means for calculating the condition variable correlated to the centrifugal acceleration from the yaw rate measured by means of a yaw rate sensor.

12. Device as claimed in claim 9, wherein said vehicle includes at least two axles and four wheels, further comprising:

> means for determining the difference of the wheel speeds on at least two axles,
>
> means for calculating the condition variable correlated to the centrifugal acceleration from at least two determined wheel speed difference data,
>
> means for comparing the so obtained condition variables and for performing a plausibility analysis.

13. Device as claimed in claim 12, further including means for comparing the algebraic signs of the roll angle and of the measured transverse acceleration for correction in the event of an inclined roadway.

14. Device as claimed in claim 9, further including means for weighting the critical roll angle with the current center of gravity of the vehicle.

15. Device as claimed in claim 9, further including means for weighting the critical roll angle with the current centrifugal acceleration.

16. Device as claimed in claim 9, further including means for an earlier detection of a developing critical roll angle.

* * * * *